Dec. 2, 1952  L. HAWORTH  2,619,797
GAS TURBINE ENGINE DRIVING A PROPELLER
Filed Dec. 20, 1948  3 Sheets-Sheet 1
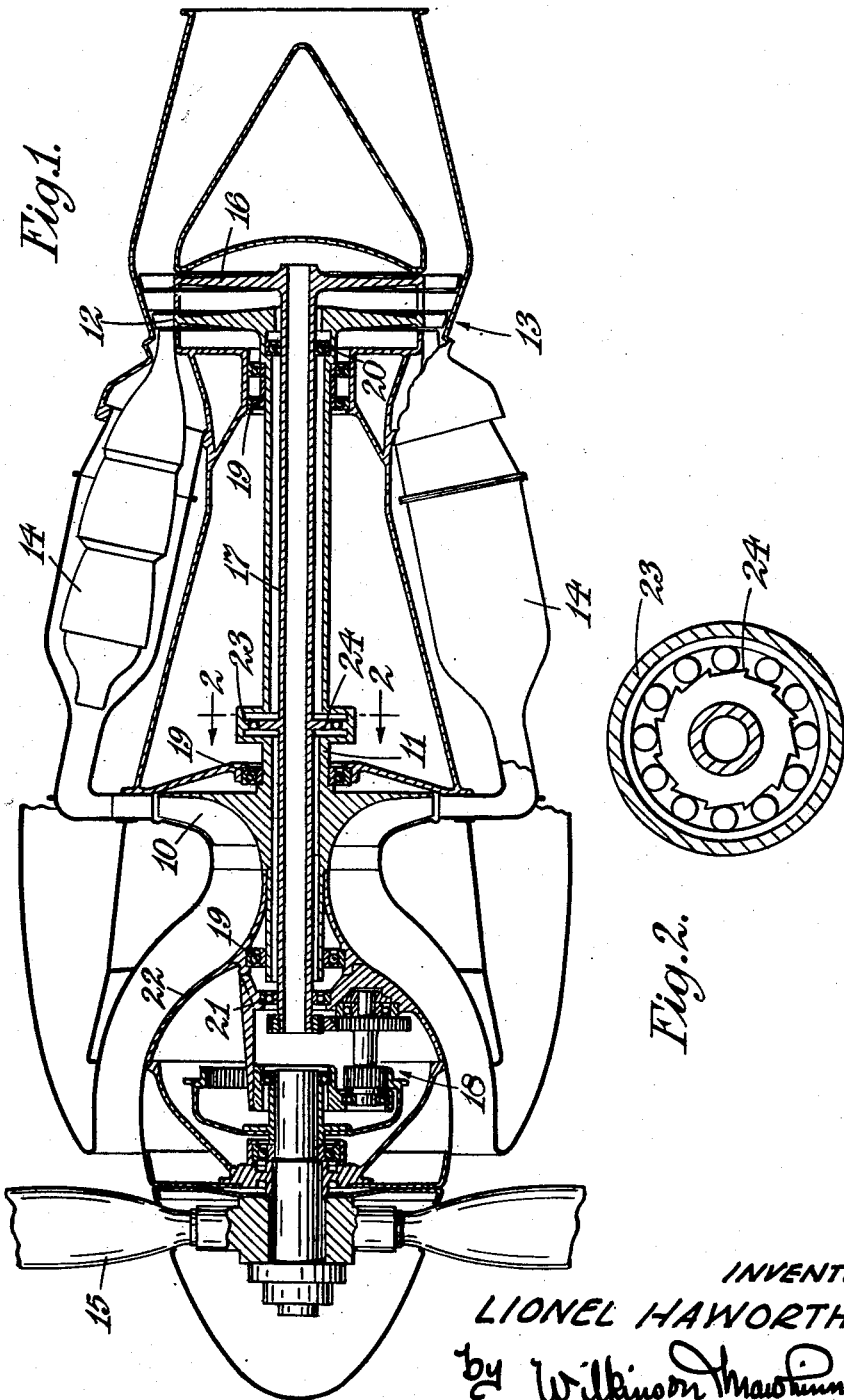
INVENTOR
LIONEL HAWORTH
by Wilkinson Mawhinney
Attorneys Dec. 2, 1952   L. HAWORTH   2,619,797
GAS TURBINE ENGINE DRIVING A PROPELLER
Filed Dec. 20, 1948   3 Sheets-Sheet 2

INVENTOR
LIONEL HAWORTH
by Wilkinson Mawhinney
Attorneys

Inventor
Lionel Haworth
By Wilkinson & Mawhinney
Attorneys

Patented Dec. 2, 1952

2,619,797

UNITED STATES PATENT OFFICE 2,619,797

GAS TURBINE ENGINE DRIVING A PROPELLER

Lionel Haworth, Derby, England, assignor to Rolls-Royce Limited, Derby, England, a British company Application December 20, 1948, Serial No. 66,307
In Great Britain January 28, 1948

6 Claims. (Cl. 60—39.16)

This invention relates to gas-turbine engines and is more particularly concerned with such engines as are used for aircraft or marine propulsion purposes by driving an air or marine propeller, and comprising separate turbines for driving the gas-turbine engine compressor and for driving the air-screw or marine propeller.

The invention has for an object to provide an improved construction of such gas-turbine engine in which control of the engine in operation is facilitated.

According to the present invention, a gas-turbine engine comprises a compressor, a first turbine drivingly connected to said compressor, an air or marine propeller, a second turbine drivingly connected to said air or marine propeller to drive it, and a free-wheel clutch interconnecting said turbines such that the speed of rotation of the second turbine cannot exceed a predetermined ratio to the speed of said first turbine.

In one preferred arrangement in which the second turbine is connected to the propeller through a shaft nested within a shaft connecting the first turbine to the compressor, the free-wheel clutch parts are carried respectively by the two shafts and conveniently located at a point intermediate the compressor and the first said turbine. In this manner the predetermined ratio at which the two shafts drivingly connect is 1—1.

Alternatively, by driving the clutch parts respectively through gears from the first and second shafts, any other desired ratio of the speeds at which the two shafts drivingly connect may be chosen.

Thus in another preferred arrangement the turbines drive first and second shafts nested one within the other, and free wheel parts are located offset from the axis of the shafts, being driven thereby through spur or equivalent gears, the ratios of which are selected to give a predetermined ratio of the speeds of the two shafts at which they drivingly connect.

Where the turbines rotate in counter-rotation an idler gear may be introduced into one of the gear trains to cause the free wheel parts to rotate in the same direction, despite the counter-rotation of the two shafts.

Adoption of the invention prevents the propeller driving turbine from over-speeding as might otherwise occur on rapid acceleration of an engine of the type to which this invention relates, or on failure of a propeller pitch change mechanism or, particularly in the case of a marine propulsion engine, on sudden reduction in the load on the propeller turbine such as occurs when the propeller leaves the water. By providing the freewheel clutch arrangement of this invention any excess of power developed by the propeller driving turbine, which tends to cause the turbine to over-speed, is transmitted to the compressor rotor assembly, that is, to the compressor and its associated turbine, which can absorb a large amount of power for a small increase in speed.

According to a feature of this invention, there may be provided in combination with the freewheel clutch arrangement above set forth, fuel control means arranged to reduce the supply of fuel to combustion equipment such as is normally provided with a gas-turbine engine, when a predetermined rotational speed of the compressor rotor assembly is reached. In this way the maximum speed of the compressor rotor assembly is limited so that overspeeding of both rotor assemblies, that is the compressor rotor assembly, and the propeller rotor assembly, can be avoided.

Some embodiments of this invention will now be described with reference to the accompanying drawings, in which:

Figure 1 is a diagrammatic sectional elevation of a gas-turbine engine driving an air-screw;

Figure 2 is a section on the line 2—2 of Figure 1;

Figure 3:
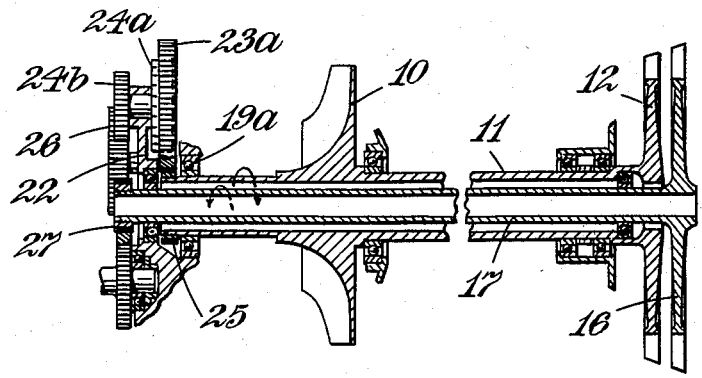
Figure 3 is a cross section illustrating a modified construction.

Referring to Figures 1 and 2, there is illustrated a gas-turbine engine comprising a centrifugal compressor 10 mounted on a shaft 11 connecting it to a turbine rotor disc 12 of a two-stage turbine 13, a series of combustion chambers 14, of which two are shown, disposed around the shaft 11 between the compressor in the turbine, said combustion chambers receiving compressed air from the compressor and delivering products of combustion to turbine to drive it, and an air-screw 15 driven by a second turbine rotor 16 through a shaft 17 nested within the shaft 11 and through a reduction gear generally indicated by reference numeral 18.

The compressor rotor assembly comprising the impeller of the compressor 10, shaft 11 and the turbine disc 12, is mounted in the stationary structure of the gas-turbine engine by means of a plurality of bearings 19 and the turbine disc 16 and its associated shaft 17 are supported in bearings, one of which, 20, is located between the shaft 17 and the shaft 11 at the turbine end thereof and in a bearing 21 supporting the opposite end of the shaft 17 in the air-screw reduction gear casing 22.

The shaft 11 is formed at a suitable point in its length and conveniently between the compressor 10 and the turbine disc 12 with a swelling 23 of cylindrical form providing the driven member of a free-wheel clutch, the driving member 24 of which is formed on the shaft 17. The driving member 24 is conveniently in the form of a flange having a series of ramp formations, as will be seen more clearly from Figure 2. A series of locking elements in the form of balls or rollers are located between the driven member 23 and the driving member 24, there being one ball or roller for each ramp on the driving member 24. When the driven member tends to rotate at a greater speed than the driving member, the balls or rollers move towards one end of the corresponding ramp clutching the driving member to the driven member.

With this construction it will be seen that the shaft 17 and thus the turbine 16 cannot rotate at a greater speed than the shaft 11 and the associated turbine 12 and compressor 10. In this way over-speeding of the power shaft 17 can be avoided.

Figure 6:
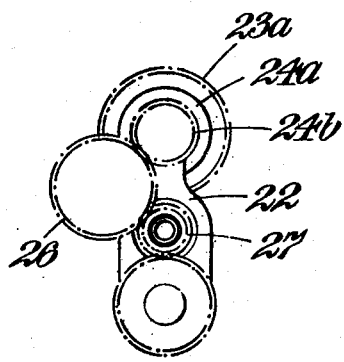
Figure 6 is an end view of Figure 3.

Referring now to Figures 3 and 6, there is illustrated the rotary parts of the modified construction. In this construction the turbine discs 12 and 16 are counter-rotating so that the shafts 11 and 17 also rotate in opposite directions. It will be clear that with counter-rotating shafts the free-wheel clutch cannot be provided between the shafts intermediate their ends so that in this construction the shaft 11 is extended beyond its forward bearing 19a and is formed externally with gear teeth 25 to mesh with gear teeth formed on the external surface of the free-wheel driven member 23a, which occupies a position offset from the shaft. The free-wheel driving member 24a has an axial extension 24b formed with gear teeth which mesh with idler gear 26 supported in the air-screw reduction gear casing 22 and the idler gear 26 is driven by gear teeth 27 formed on the end of the shaft 17 where it projects beyond the end of the shaft 11. In this way although the shafts 11 and 17 are driven in opposite directions the free-wheel driving and driven members rotate in the same direction and therefore serve to prevent the turbine 16 from over-speeding by permitting the turbine 16 to drive the compressor rotor assembly when its speed tends to exceed a given ratio to the speed of the compressor rotor assembly. The ratio of the speed of the turbine 16 to the compressor rotor assembly at which the free-wheel clutch becomes operative can be selected by suitably proportioning the elements 25, 23a, 24b, 26 and 27.

Figure 5:
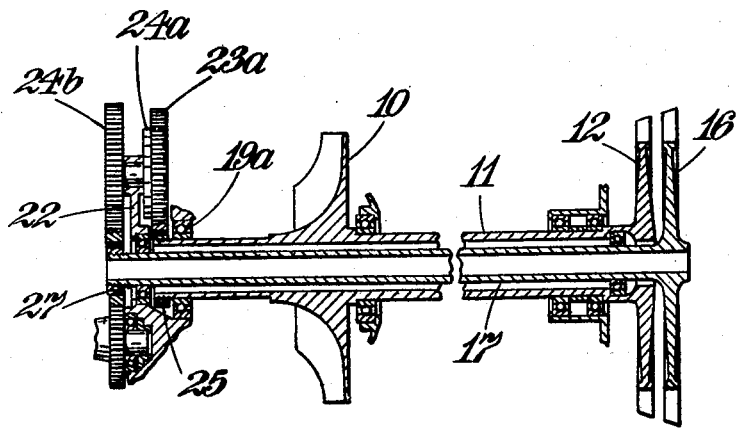
Figure 5 illustrates another modification.
Figure 7:
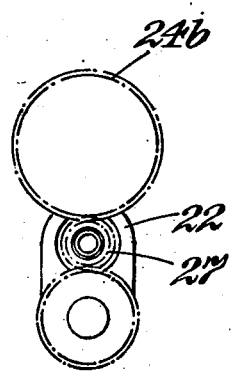
Figure 7 is an end view of Figure 5.

A similar arrangement to that described with reference to Figures 3 and 6 but omitting the idler gear 26, may be employed where the two turbines rotate in the same direction. Such an arrangement is shown in Figures 5 and 7 from which it will be seen that the gear 24b meshes directly with the gear 27 though otherwise the construction is the same as in Figures 3 and 6. With this arrangement the driving connection between the two shafts may be effected at any predetermined ratio of their speeds according to the gear ratios between the shafts and the clutch parts.

Figure 4:
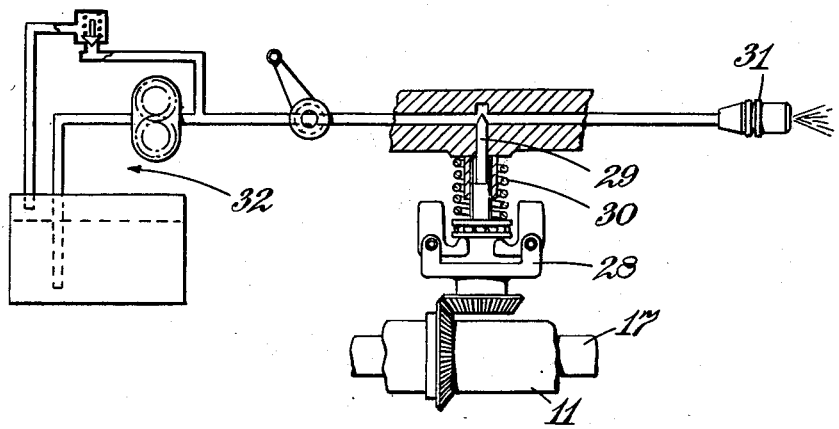
Figure 4 illustrates a further modification.

Referring now to Figure 4, there is illustrated a further modification in which means is provided not only to limit the ratio of the speed of the turbine 16 to the compressor rotor assembly but also means to limit the speed of the compressor rotor assembly. The shaft 11 is arranged to drive a centrifugal governor 28 arranged to move the valve 29 against the action of a spring 30. The valve 29 operates to control the flow of fuel from the engine fuel supply system 32 to the fuel injectors 31 of the combustion equipment of the gas-turbine engine and is arranged to become operative to reduce the fuel supply when the speed of the compressor rotor assembly reaches a preselected value. Such an arrangement may be employed with either of the constructions of gas-turbine engine above described.

I claim:

1. A gas turbine engine comprising the combination with a compressor, a first turbine drivingly connected to said compressor, a propeller, and a second turbine drivingly connected to said propeller to drive it, and combustion equipment receiving compressed working fluid from said compressor, the products of combustion passing to said turbines, of a free-wheel clutch having a first member, a second member and clutching means operative to transmit torque only from said second member to said first member of which said first member is drivingly connected to said first turbine, and of which said second member is drivingly connected to said second turbine.

2. A gas turbine engine comprising the combination with a compressor, a first turbine, a hollow shaft drivingly interconnecting said compressor with said first turbine, a propeller, a second turbine, combustion equipment receiving compressed working fluid from said compressor, the products of combustion passing to said turbines and a shaft drivingly interconnecting said propeller with said second turbine coaxial with and nested within the hollow shaft, of a free-wheel clutch accommodated within said hollow shaft, comprising a first member drivingly connected to said hollow shaft to rotate therewith and a second member drivingly connected to said nested shaft to rotate therewith, and clutching means operative to transmit torque only from said second member to said first member.

3. A gas turbine engine comprising the combination with a compressor, a first turbine, a hollow shaft drivingly interconnecting said compressor with said first turbine, a propeller, a second turbine, combustion equipment receiving compressed working fluid from said compressor, the products of combustion passing to said turbines and a shaft drivingly interconnecting said propeller with said second turbine coaxial with and nested within the hollow shaft, of a free-wheel clutch comprising a first member and a second member and clutching means operative to transmit torque only from said second member to said first member, said free-wheel clutch being located in a position offset from said shafts, a first gear train interconnecting said first member with said hollow shaft, and a second gear train interconnecting said second member with said nested shaft in such a manner that said first and second members rotate in the same direction.

4. A gas turbine engine comprising the combination with a compressor, a first turbine, a hollow shaft drivingly interconnecting said compressor with said first turbine, a propeller, a second turbine rotating in an opposite direction to said first turbine, combustion equipment receiving compressed working fluid from said compressor, the products of combustion passing to said turbines, and a shaft drivingly interconnecting said propeller with said second turbine coaxial with and nested within the hollow shaft, of a free-wheel clutch comprising a first member and a second member and clutching means operative to transmit torque only from said second member to said first member said free-wheel clutch being located in a position offset from said shaft, a first gear train interconnecting said first member with said hollow shaft, and a second gear train interconnecting said second member with said nested shaft and so arranged that said second member rotates in the same direction as said first member.

5. A gas turbine engine as claimed in claim 4 wherein said second gear train comprises an idler gear.

6. A gas turbine engine as claimed in claim 1 and comprising also a fuel control device including means responsive to the speed of said first turbine, and valve means operated by said speed-responsive means to control the supply of fuel to the engine and thereby, when torque is being transmitted from said second member to said first member, to control the speed of said second turbine.

LIONEL HAWORTH.

REFERENCES CITED

The following references are of record in the file of this patent:

UNITED STATES PATENTS

| Number | Name | Date |
|---|---|---|
| 2,095,991 | Lysholm | Oct. 19, 1937 |
| 2,243,467 | Jendrassik | May 27, 1941 |

FOREIGN PATENTS

| Number | Country | Date |
|---|---|---|
| 772,703 | France | Aug. 20, 1934 |
| 587,516 | Great Britain | Apr. 29, 1947 |